United States Patent Office 3,413,199
Patented Nov. 26, 1968

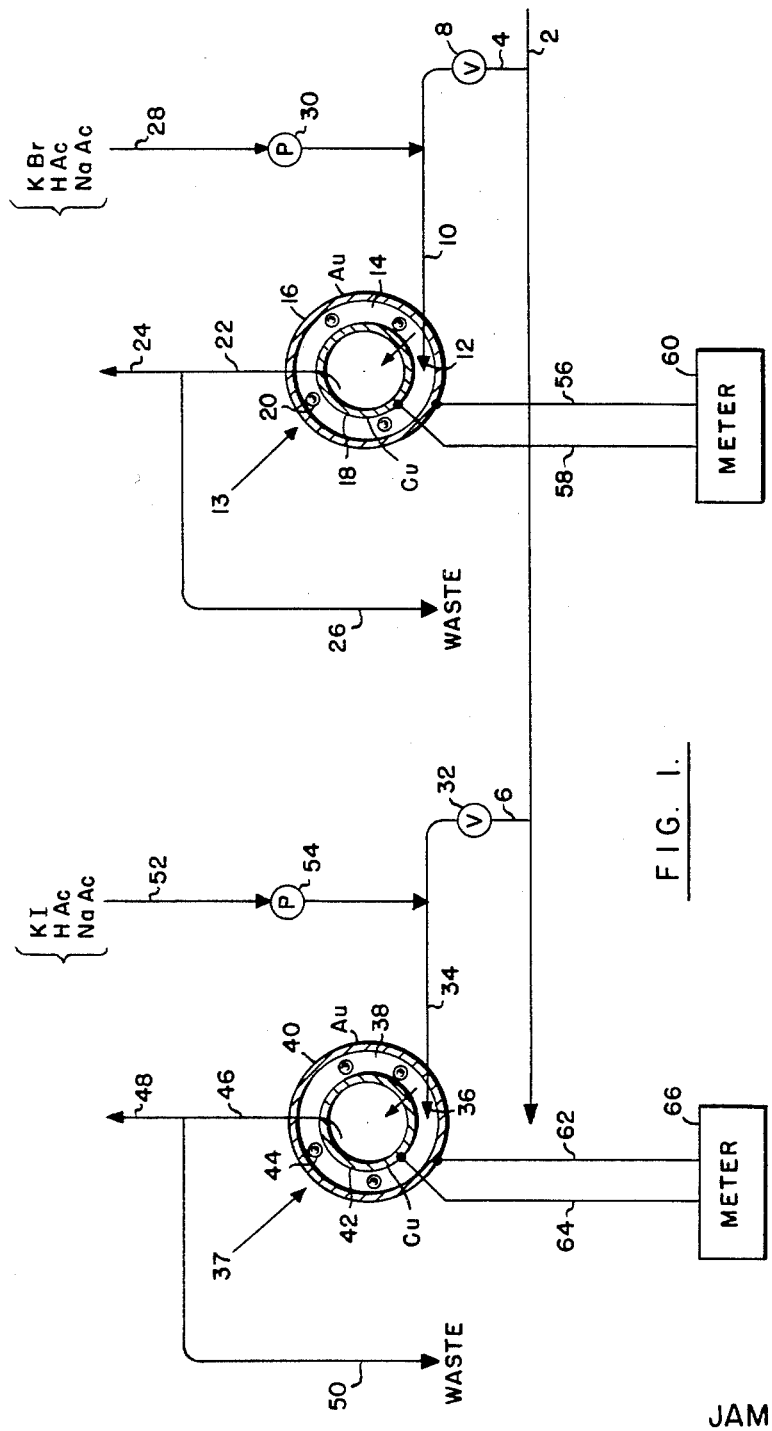

3,413,199
METHOD FOR MEASUREMENT OF RESIDUAL CHLORINE OR THE LIKE
James J. Morrow, Jr., Norristown, Pa., assignor to Fischer & Porter Company, Warminster, Pa., a corporation of Pennsylvania
Continuation-in-part of application Ser. No. 433,398, Feb. 17, 1965. This application Sept. 29, 1965, Ser. No. 491,205
2 Claims. (Cl. 204—1)

ABSTRACT OF THE DISCLOSURE

A method for determining free chlorine in distinction from chloramines in solution in an aqueous sample involves the addition of a soluble bromide to the sample followed by introduction of the sample as an electrolyte into a cell subject to cathodic polarization and measurement of the depolarizing action of the sample in the cell. If both free chlorine and chloramines are to be detected, the same sample or another sample of the original solution has added to it a soluble iodide followed by measurement of its depolarizing action in a second similar cell.

This invention relates to method and apparatus for measurement of residual chlorine.

This application is in part a continuation of my application Ser. No. 433,398, filed Feb. 17, 1965.

In the treatment of water or sewage with chlorine it is necessary, in order to insure adequate chlorination, that measurements be made in the system to ascertain its residual chlorine (or its equivalent) at some point following the zone of treatment. The presence of chlorine residual has been commonly detected and measured by making use of the principle of depolarization to generate an electricial current which, considering the low levels of the chlorine residual, is approximately proportional to the residual content. In carrying out this method a sample of the water to be analyzed flows continuously between two dissimilar metal electrodes immersed therein, the water acting as an electrolyte forming with the electrodes a galvanic cell. The electrical circuit between the two electrodes is completed outside the cell through an indicating or recording meter. While other electrode combinations may be used, it is common to make one of the electrodes of gold or other noble metal and the other of copper or the like. If there is no oxidizing agent present in the water the current flow will be stopped or very considerably reduced by the buildup of a polarization layer on the more noble metal electrode.

The chlorine, or the oxidizing agent produced thereby, as more fully discussed later, will oxidize the polarizing layer creating a greater current flow. The scale of the indicating or recording meter may be conveniently calibrated in terms of the chlorine residual, the current being a function of the concentration of the oxidizing material persent.

Satisfactory operation occurs when the residual chlorine content is low. But when it is high (10 p.p.m. or more) the operation may be erratic; not only is there a departure from linearity of current as a function of chlorine residual, but the relationship is a function varying from time, i.e., the current drifts downwardly with time even though the chlorine present is constant so that readings become a function of the past history of the operation.

The residual chlorine in the liquid being measured is present in two general forms. First, there is the free chlorine, possibly in the form of equivalent hypochlorous acid, by reaction with water, representing, so far as organic material carried by the water is concerned, unreacted chlorine. Secondly, there aer what are aclled chloramines representing reaction of chlorine with nitrogenous organic material. The latter constitute products serving as a measure of organic material in sewage or other contaminated water, and it is desirable, and an object of the present invention, to determine the chloramine content as a measure of this organic contamination. Heretofore, for best results in determination of residual chlorine in both forms, and without their distinction, it has been customary to feed to the sample of water undergoing analysis an alkali iodide generally in a buffer to maintain a slightly acidic pH. The chlorine in both forms reacts with the iodide to liberate iodine which acts as the depolarizing agent. The use of iodide in this fashion does not distinguish the form in which the chlorine is present, an equivalent amount of iodine being liberated by the total chlorine content. Accordingly there has been no distinction between the chlorine forms.

It has now been found that if, instead of alkali iodide, the treatment is with alkali bromide, also in a buffer to secure the optimum slightly acidic pH, bromine, to act as the oxidizing agent, is liberated only by the free chlorine (or equivalent hypochlorous acid) but is not liberated by the chlorine present in the form of chloramines. Consequently, it is possible, in accordance with the invention, to segregate for measurement the free chlorine from that present in the chloramine form.

Usually it will be desirable to detect chlorine in each of its forms, and in accordance with a preferred form of the invention samples of the water are treated separately with iodide and with bromide. Measurement of the results of the first treatment will give total cholrine content and measurement of the results of the second treatment will give free chlorine content, so that by difference the chloramine content is obtained. However, if desired, the bromide treatment may be used alone for the detection of the free chlorine to the exclusion of the chloramine content.

In either case the addition of a bromide stabilizes the operation to give true readings even when the chlorine content is high.

The objects of the invention are concerned with the accomplishment of the results indicated above and will become more apparent from the following description, read in conjunction with the accompanying drawing in which:

FIGURE 1 represents diagrammatically an apparatus used in accordance with the invention; and FIGURE 2 represents diagrammatically an alternative type of cell operation which may be used in carrying out the invention.

Details of the apparatus used may be conventional and need not be described.

Referring to FIGURE 1 of the drawing, there is indicated at 2 a main water line at a particular location at which measurements are desired. Generally speaking, chlorination is effected at one point of a water supply system and flow then takes place into a tank or through a sufficient region of flow for the chlorine to act effectively on the materials present in the water to produce its purifying action through adequate contact time. Measurements are made beyond this point to determine whether the amount of chlorine added has been adequate. While measurement will be primarily referred to it will be evident that the measuring meter or meters may serve as controls for the feed of chlorine in adequate but not excessive amounts. In the region where measurements are to be made samples are drawn from the main line 2 at points 4 and 6.

Referring first to the right-hand apparatus, the sampling connection 4 is controlled by a valve 8 to provide a minor flow of the water through a connection 10 to a first measuring cell 13. This cell may take various forms of which one may be that indicated. In this form the water is introduced tangentially at 12 into an annular space 14 between an outer noble metal electrode 16, indicated as of gold, and an inner electrode 18, indicated as of copper. Circulating flow occurs in the annulus 14 in which there are usually mounted small dielectric balls (glass, ceramic or plastic) 20 which, by centrifugally rubbing the electrode 16 maintain its surface clean.

Discharge is effected through one or more slots into the center of the electrode 18 and thence to a discharge line 22 communicating with a head-maintaining overflow arrangement 24 which is not detailed and through a line 26 to waste. This type of measuring apparatus is quite conventional and is illustrated, for example, in Patent 2,890,406. Alternatively, other types of apparatus may be used, for example, the apparatus disclosed in the application of Kaltenhauser and Schweinsberg, Ser. No. 400,977, filed Oct. 2, 1964. Other measuring devices having rotating electrodes are also known and in use.

In accordance with the present invention, there is fed into the connection 10 from a supply tank communicating with a delivery line 28 a concentrated aqueous solution of an alkali bromide, for example potassium bromide, in a buffer providing desirable slight acidity, there being usable for this purpose, for example, an acetic acid-sodium acetate buffer of conventional type. Other buffers may, of course, be used. The feed of the bromide-buffer solution is desirably at a low rate controlled by a pump indicated at 30 which may be of the type disclosed in Patent 3,139,829. Adjustment of the pumping rate, considering the concentration of the solution, is made so that there is sufficient introduction of the bromide in excess of the maximum concentration of the free chlorine in the water sample to take care of the liberation of free bromine by all of the free chlorine, i.e., for proper operation all of the free chlorine should replace equivalent free bromine in the measuring cell. Excess bromide will do no harm, since the current produced in the cell is solely a function of the concentration of the freed bromine.

In the left of FIGURE 1 there is shown an identical system receiving the sample flow from the connection 6, with the exception that the treatment of the water in this case is with an iodide solution. A valve 32 controls the flow of the sample through the connection 34 to the tangential inlet 36 of the cell 37 which provides an annular circulatory passageway 38 between the gold outer electrode 40 and the inner copper electrode 42, there being also in this cell cleaning balls 44. The outlet 46 from this cell is connected to the head-maintaining system 48 and to the discharge connection 50. In this case, however, the addition to the water in the connection 34 is of a concentrated aqueous solution of alkali iodide, for example potassium iodide, in a buffer similar to that previously described, the feed being by a pump 54 of the same type as the pump 30. In this case the amount of the iodide-buffer mixture added is such that the total chlorine, both free and in the form of chloramines, will displace iodine, the amount of the iodide fed being such that it will be in excess of the requirement that all of the chlorine should be replaced by freed iodine in the cell 37.

The respective electrodes of the cell 13 are connected through lines 56 and 58 to a suitable meter 60 capable of measuring the small currents produced. This meter may be of a recording type and may be such as to provide control, if desired.

Similarly lines 62 and 64 connect the electrodes of the cell 37 to a similar meter 66.

The overall operation of what has been described will now be readily understood. The meter 66 reads the total chlorine content, i.e., the content of free chlorine and of chlorine in the form of chloramines. The meter 60, on the other hand, reads only the free chlorine content since bromine is liberated only by the free chlorine. The difference of the meter readings will give at any time the chloramine content. It will be evident that utilizing a conventional subtraction network there may be fed to a single meter an output corresponding to the difference of the two outputs to give a direct visual or recorded reading of the chloramine content.

It will be seen from the foregoing that there is provided a system differentiating between the two forms of residual chlorine. As already mentioned, if only the free chlorine content is desired, the right-hand system alone may be used.

The foregoing describes the feeding of the two cells in parallel, with separate samples withdrawn from the same measurement region of the water conduit 2. An obvious alternative system may be used in which a single sample may first have added to it the bromide followed by the measurement in a cell such as 13 of the free chlorine content. The effluent from this cell may then have iodide solution added to it prior to passage into a cell such as 37 in which the total chlorine will give rise to the measured current. The fact that bromide is already present does not affect the determination of total chlorine resulting from the addition of the iodide and measurement in the second cell.

The respective bromide and iodide additions are desirably by way of alkali salts though it will be evident that other soluble metallic bromides or iodides may be added so long as they are of metals not interfering with the desired cell action.

In the foregoing the measurements are effected in cells which generate the current involved by galvanic action, utilizing dissimilar electrodes. Alternatively, the cells may be energized from an external source, and FIGURE 2 illustrates this modification. A cell 68 which may replace either or both of the cells previously described has both of its electrodes 70 and 72 formed of the same metal, in this case a noble metal such as gold or platinum. The construction of the cell 68 is otherwise the same as already indicated. Current source may be provided by a battery such as a mercury cell having a voltage of 1.35 volts. Across this is a voltage divider provided by a potentiometer 76 which may be of high resistance such as 10,000 ohms to avoid undue drain on the battery. The adjustable contact 78 serves to set the potential supplied to the cell through a resistor 80 across which is located the indicating or recording meter 82. The potentiometer provides a suitable voltage for the cell used, depending, for example, on the depolarizing material, iodine or bromine. The meter-shunting resistance 80 may be chosen to give the desired full scale meter reading which might be, typically, in one or more parts per million full scale of the chlorine content being measured.

In accordance with FIGURE 2, polarization will occur in the absence of halogen, which will act as a depolarizing agent in accordance with the liberated amount present in the same fashion as previously described for the self-generating cell.

It will be evident that various details of the apparatus may be modified without departing from the invention as defined in the following claims.

I claim:

1. The method for the determination of free chlorine in distinction from chloramines in solution in an aqueous sample comprising adding to said sample a soluble bromide, in the absence of an iodide, and in excess of the free chlorine in the sample, then introducing the sample as an electrolyte into a cell subject to cathodic polarization, and measuring the electrical signal resulting from depolarizing action in the cell.

2. The method for the determination of chlorine in the respective forms of free chlorine and chloramines in an aqueous solution comprising adding to a sample of said solution a soluble bromide, in the absence of an iodide, and in excess of the free chlorine in the sample, then introducing the sample as an electrolyte into a cell subject to cathodic polarization, and measuring the electrical signal resulting from depolarizing action in the cell; and adding to a sample of said solution a soluble iodide in excess of the chlorine in the sample, then introducing the last sample as an electrolyte into a second cell subject to cathodic polarization, and measuring the electrical signal resulting from depolarizing action in the second cell.

References Cited

UNITED STATES PATENTS

| | | | |
|---|---|---|---|
| 2,585,811 | 2/1952 | Marks | 204—195 |
| 2,617,715 | 11/1952 | Haller | 23—230 |
| 2,851,655 | 9/1958 | Haddad | 204—195 |
| 3,043,764 | 7/1962 | Harvey | 204—195 |
| 3,234,117 | 2/1966 | Rost et al. | 204—195 |
| 3,296,113 | 1/1967 | Hansen | 204—195 |

HOWARD S. WILLIAMS, *Primary Examiner.*

T. TUNG, *Assistant Examiner.*